(12) United States Patent
Mansour et al.

(10) Patent No.: US 12,401,457 B2
(45) Date of Patent: Aug. 26, 2025

(54) DYNAMIC HYBRID AUTOMATIC REPEAT REQUEST ACTIVATION/DEACTIVATION IN 5G AND 6G RADIO INTERFACE

(71) Applicant: T-Mobile Innovations LLC, Overland Park, KS (US)

(72) Inventors: Nagi A. Mansour, Arlington, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 494 days.

(21) Appl. No.: 17/824,104

(22) Filed: May 25, 2022

(65) Prior Publication Data
US 2023/0388057 A1      Nov. 30, 2023

(51) Int. Cl.
*H04L 1/1812* (2023.01)
*H04B 17/309* (2015.01)

(52) U.S. Cl.
CPC ......... *H04L 1/1812* (2013.01); *H04B 17/309* (2015.01)

(58) Field of Classification Search
CPC ... H04L 1/1812; H04L 1/1819; H04L 1/1825; H04B 17/309
See application file for complete search history.

(56) References Cited

U.S. PATENT DOCUMENTS

| | | | | |
|---|---|---|---|---|
| 8,553,718 B2* | 10/2013 | Nagaraja | ............... | H04L 1/0026 370/468 |
| 10,440,771 B2* | 10/2019 | Chen | ..................... | H04L 1/1861 |
| 10,912,115 B2* | 2/2021 | Dudda | .................. | H04L 1/1874 |
| 11,902,818 B2* | 2/2024 | Zhou | ..................... | H04W 76/27 |
| 2010/0281322 A1* | 11/2010 | Park | ...................... | H04L 1/1825 714/E11.131 |
| 2013/0070629 A1* | 3/2013 | Park | ...................... | H04L 1/0001 370/252 |
| 2016/0261391 A1* | 9/2016 | Chen | ..................... | H04L 1/1861 |
| 2017/0085302 A1* | 3/2017 | Tong | ..................... | H04B 7/065 |
| 2017/0317791 A1* | 11/2017 | Wiberg | ................. | H04L 1/1861 |
| 2018/0295633 A1* | 10/2018 | Abdelmonem | ..... | H04L 43/0829 |
| 2019/0319751 A1* | 10/2019 | Chen | ..................... | H04L 1/1812 |
| 2021/0075553 A1* | 3/2021 | Wang | ................... | H04L 5/0055 |
| 2021/0127284 A1* | 4/2021 | Abdelmonem | ....... | H04W 24/08 |
| 2022/0038243 A1* | 2/2022 | Shrestha | ................ | H04L 1/188 |
| 2022/0038933 A1* | 2/2022 | Ma | .......................... | H04L 1/203 |
| 2022/0191725 A1* | 6/2022 | Ashraf | .................. | H04L 5/0053 |
| 2023/0261802 A1* | 8/2023 | Kunt | ..................... | H04L 1/1822 370/329 |

* cited by examiner

*Primary Examiner* — Redentor Pasia
(74) *Attorney, Agent, or Firm* — SHOOK, HARDY & BACON L.L.P.

(57) ABSTRACT

Systems and methods are provided for dynamically activating and deactivating hybrid automatic repeat request (HARQ). The system includes a base station, user equipment (UE), and a processor. The method provides for determining a first signal quality measurement for the signal quality between the base station and the UE. The first signal quality measurement is then compared with a predetermined signal quality threshold. If the first signal quality measurement is below the predetermined signal quality threshold the UE is directed to activate HARQ. If the first signal quality measurement is above the predetermined signal quality threshold the UE is directed to deactivate HARQ if HARQ is currently active.

20 Claims, 6 Drawing Sheets

DYNAMIC HYBRID AUTOMATIC REPEAT REQUEST ACTIVATION/DEACTIVATION IN 5G AND 6G RADIO INTERFACE

BACKGROUND

Wireless communication networks include mechanisms to handle common sources of interference and noise. These sources of interference can include high traffic volume, high density of cell sites in an area, small cells, television broadcast towers, community access television (CATV) amplifiers, inter-cell interference (ICI) at the cell edge, passive intermodulation, other mobile users, and others. When interference is present a technique known as hybrid automatic repeat request (HARQ) can be used to cope with the interference. HARQ will cause a sender to retransmit packets that were not received and through soft combining and uses a buffer to store incomplete information the data can be combined to allow decoding of the complete signal. While HARQ is useful when interference is a problem, the technique incurs significant costs in power efficiency, throughput, computational power, and delay. Dynamically activating and deactivating HARQ based on radio link conditions more efficiently uses resources and improves network throughput.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter In an embodiment a system for dynamic hybrid automatic repeat request (HARQ) activation is provided. The system comprises a base station and a user equipment (UE) with one or more antennas. The antennas receive a first downlink signal from the base station and also transmit a first uplink signal to the base station. The system also includes a processor that is configured to determine a first signal quality measurement for the signal between the base station and the UE. The processor then determines if the first signal quality measurement is below a predetermined signal quality threshold. If the first signal quality measurement is below the predetermined signal quality threshold, then the UE is directed by the processor to activate HARQ.

In a further embodiment, a non-transitory computer storage media storing computer-usable instructions, that, when used by one or more processors, cause the processors to perform a series of steps. The one or more processors determine a first signal quality measurement for the signal quality of a downlink signal between a base station and a user equipment (UE). Next, the one or more processors determine if the first signal quality measurement is below a predetermined signal quality threshold. If the first signal quality measurement is below the predetermined signal quality threshold, then HARQ is activated. Conversely, if the signal quality measurement is above the predetermined signal quality threshold, then HARQ is not activated, and if on, may be deactivated.

A still further embodiment provides a method for activating or deactivating HARQ. The method comprises determining a first signal quality measurement. Next, the method continues with determining if the first signal quality measurement is above or below a predetermined signal quality threshold. HARQ is activated if the first signal quality measurement is below the predetermined signal quality threshold. HARQ is deactivated if the first signal quality measurement is above the predetermined signal quality threshold.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and non-removable media, and contemplate media readable by a database, a switch, a UE, and/or various other network or user devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. In aspects, a base station is defined by its ability to communicate with a UE according to various wireless communication protocols (e.g., 3G, 4G, LTE, 5G, and the like); however, the RF signals exchanged between a UE and the base station may be affected by any number of natural or artificial phenomenon that may affect the gain of the RF signals. For example, if a UE is in the middle of a high rise office building, it may have a significantly reduced ability to communicate with the base station because of the reflection from the building's windows, the layers of construction materials (e.g., interior walls) between the UE and the base station, and/or noise created near the UE's location or anywhere in the path of the RF signal between the UE and the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 7.

Accordingly, a first aspect of the present disclosure is directed to a system for dynamic HARQ activation. The system comprises: a base station, a UE comprising one or more antennas for receiving a first downlink signal from the base station and for transmitting a first uplink signal to the base station, and a processor. The processor is configured to: determine a first signal quality measurement for the signal quality between the base station and the UE. The processor also determines if the first signal quality measurement is below a predetermined signal quality threshold. Then the processor directs the UE to activate HARQ if the first signal quality measurement is below the predetermined signal quality threshold. If the first signal quality measurement is below the predetermined signal quality threshold, then the processors direct the UE to activate HARQ.

In a second aspect, the present disclosure is directed to a non-transitory computer storage media storing computer-useable instructions that, when used by one or more processors, cause the processors to determine a first signal quality measurement for the signal quality of a downlink signal between a base station and a UE. The processors also determine if the first signal quality measurement is below a predetermined signal quality measurement.

In a third aspect, the present disclosure is directed to a method for dynamic HARQ activation and deactivation. The method begins with determining a first signal quality measurement. The method continues with determining if the first signal quality measurement is above or below a predetermined signal quality threshold. The method further provides for activating HARQ if the first signal quality measurement is below the predetermined signal quality threshold and deactivating HARQ is the first signal quality measurement is above the predetermined signal quality threshold.

Figure 1:
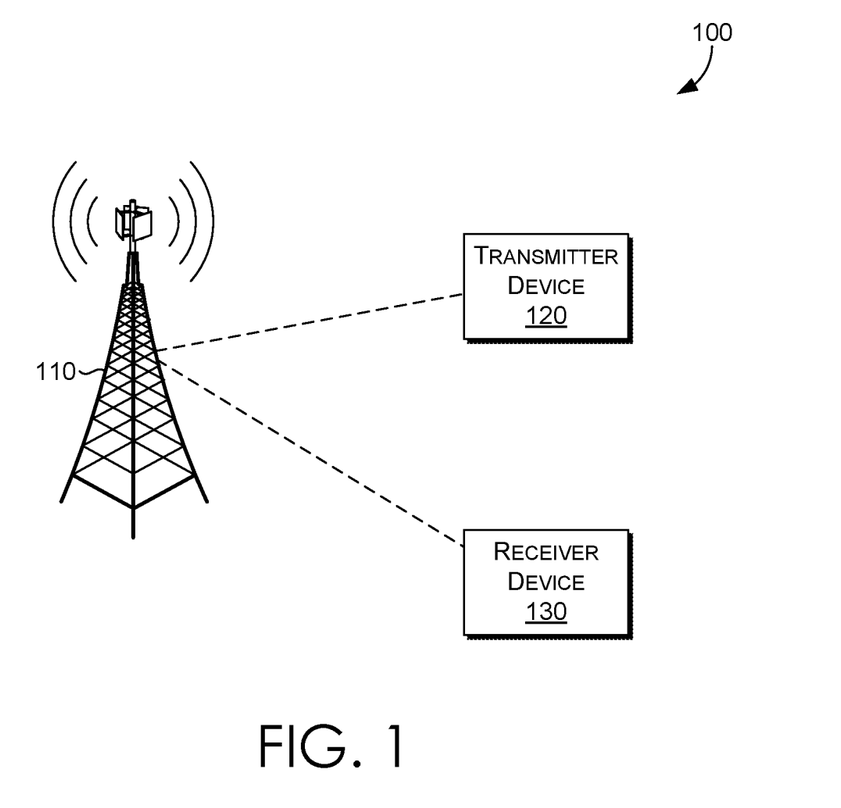
FIG. 1 depicts an example of a network environment in accordance with one or more embodiments.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more transmitter devices 120 and receiver devices 130. The transmitter device 120 may also be known as a provider device or a calling device. In some embodiments, the network environment 100 may include a telecom network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The telecom network included in the network environment 100 may include or otherwise may be accessible through a cell site (e.g., the cell site 110). The cell site may include one or more antennas, base transmitter stations, radios, transmitter/receivers, digital signal processors, control electronics, GPS equipment, power cabinets or power supply, base stations, charging stations, etc. such that the cell site may provide a communication link between one or more user devices (e.g., one or more provider devices and/or receiver devices such as the transmitter device 120 and receiver device 130) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-standalone (NSA) mode. In the non-standalone mode the network environment 100 may take the form of, for example, an E-UTRAN New Radio-Dual Connectivity (EN-DC) network. In an EN-DC network, a provider device and/or a receiver device may connect to or otherwise access a 4G, LTE, 5G, or any other suitable network simultaneously. In the stand alone mode, the telecom network may take the form of a 5G, 6G, or any other suitable network.

In some embodiments, the network environment 100 may include one or more nodes communicatively coupled to one or more provider devices and one or more receiver devices such that the node(s) may transmit to and receive requests and/or data from the provider device(s) and/or the receiver device(s). The one or more nodes may include a Next Generation Node B (e.g., gNodeB or gNB) or any other suitable node. The one or more nodes may correspond to one or more frequency bands within which the provider device(s) and/or the receiver device(s) may connect to the network environment such as, but not limited to, a telecommunication network or a portion thereof.

In some embodiments, the node(s) may be included within the cell site (e.g., the cell site 110), external to the cell site, or otherwise communicatively coupled to the cell site. The node(s) may allocate radio frequency, or a portion thereof, to user device(s).

In some embodiments, the transmitter device(s) and/or the receiver device(s) may take the form of a wireless or mobile device capable of communication via the network environment 100. For example, the transmitter device 120 may take the form of a mobile device capable of communication via a telecom network such as, but not limited to, a wireless telecommunication network. In this regard, the transmitter device(s) and/or the receiver device(s) may be any computing device that communicates by way of a network, for example, a 4G, LTE, WiMAX, Wi-Fi, 5G, 6G, or any other type of network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunication providers that provide services (e.g. 5G, 6G, voice, location, data, etc.) to one or more user devices. For example, the transmitter device 120 and/or the receiver device 130 may be subscribers to a telecommunication service provider, in which the devices are registered or subscribed to receive voice and data services (e.g., receive content that may be streamed, downloaded, etc.) over the network environment 100. The network environment 100 may include any communication network providing voice and/or data service(s), such as, for example, a Wi-Fi network, 4G network (LTE, WiMAX, HSDPA), 5G network, or 6G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
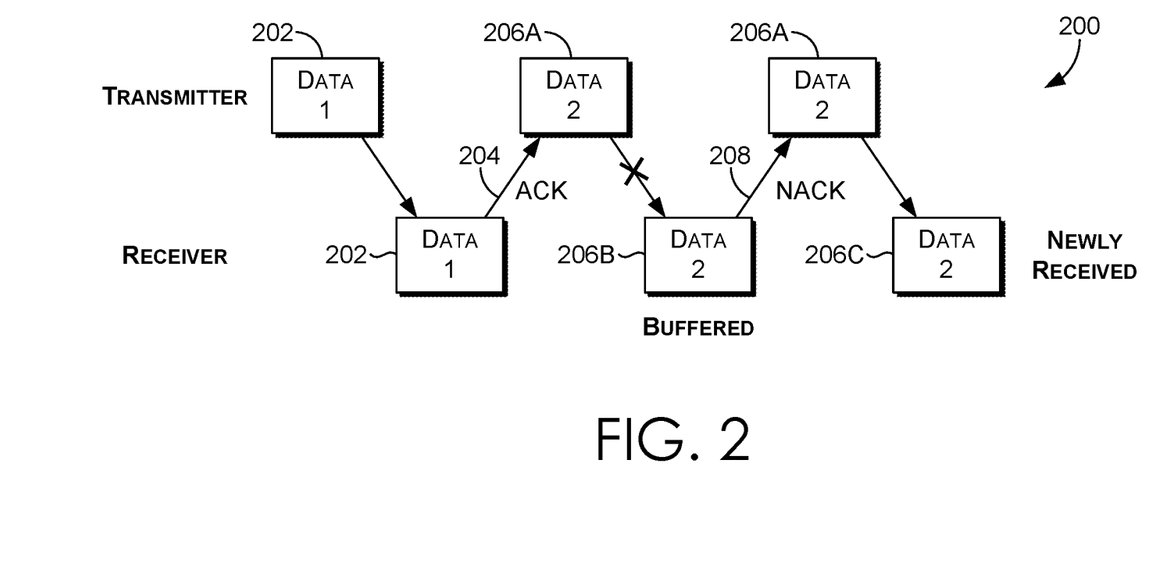
FIG. 2 is a block diagram for a hybrid automatic repeat request (HARQ) procedure in which implementations of the present disclosure may be employed.

FIG. 2 is a block diagram for a hybrid automatic repeat request (HARQ) procedure in which implementations of the present disclosure may be employed. A HARQ system 200 operates between a transmitter and a receiver. The transmitter sends a data block 1 202 to the receiver. In this instance, the data block 202 is received by the receiver, which then sends an acknowledgement (ACK) to the transmitter. The transmitter then sends data block 2 206A to the receiver, but this data block, shown as data block 2 206B is not received. The receiver sends a negative acknowledgement (NACK) 208 to the transmitter, advising that the last data block was not received. The transmitter then re-sends data block 2 206A to the receiver, which receives it as data block 2 206C, the newly received block. These operations are the automatic repeat request function.

HARQ also uses soft combining, an error correction technique in which the bad or corrupted packets are not discarded, but instead are stored in a buffer. The buffer can store up to 256 samples. The packets that are received with missing or incomplete information can be combined together in such a way that the complete signal or data block can be decoded.

Figure 3:
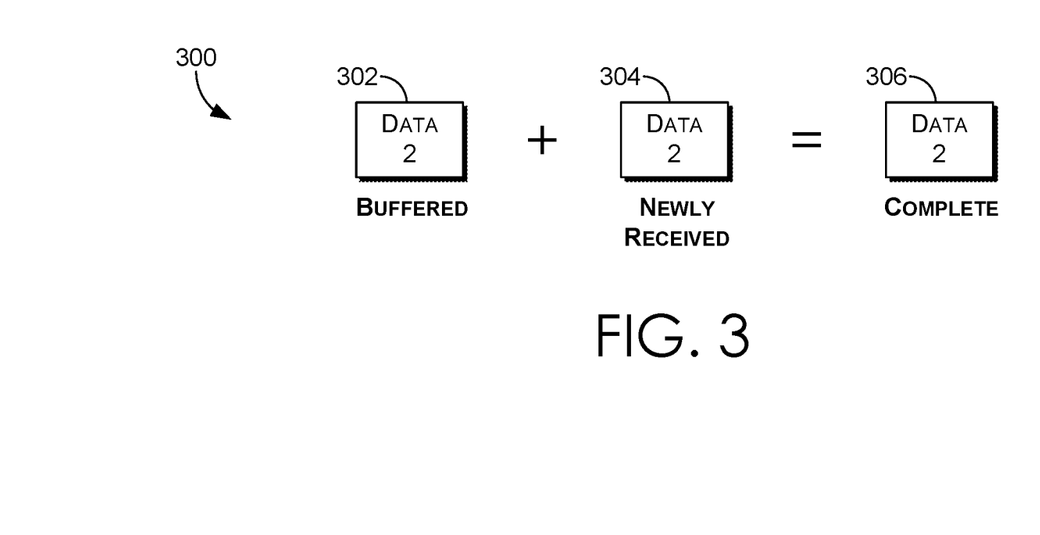
FIG. 3 is a block diagram of hybrid automatic repeat request (HARQ) processing, in accordance with aspects herein.

FIG. 3 is a block diagram of hybrid automatic repeat request (HARQ) processing, in accordance with aspects herein. The HARQ soft combining process 300 operates by combining data block 2 302 that was buffered as a corrupted packet with newly received data block 2 304 to produce a complete data block 2 306.

Figure 4:
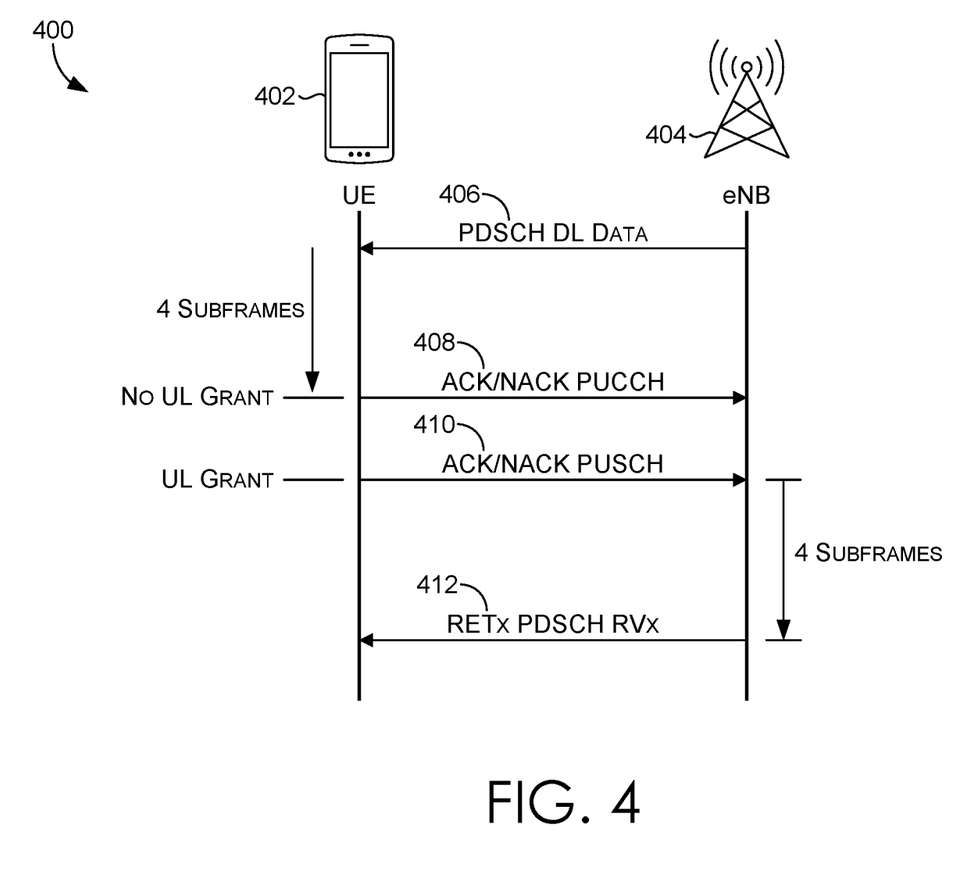
FIG. 4 depicts message flow for a hybrid automatic repeat request (HARQ) procedure during downlink transmission, in accordance with aspects herein.

FIG. 4 depicts message flow for a hybrid automatic repeat request (HARQ) procedure during downlink transmission, in accordance with aspects herein. The downlink HARQ process 400 is used during downlink transmission. A UE 402 is in communication with an eNodeB 404 with the eNodeB 404 transmitting data to the UE 402. The data is transmitted using a physical downlink shared channel (PDSCH) downlink (DL) data message 406. The PDSCH is the main data bearing channel and is allocated to users dynamically. The PDSCH carries user specific data and the downlink payload. The receiving UE 402 determines if the PDSCH DL data message 406 is correct by checking the cyclic redundancy codes (CRC).

If the UE 402 does not have an uplink grant to transmit the UE 402 will send an acknowledgement (ACK) 408 if the PDSCH DL data message 406 was correctly received and a negative acknowledgement (NACK) 408 if the PDSCH DL data message 406 was not correctly received. The ACK/NACK 408 is sent on the physical uplink control channel (PUCCH) when the UE 402 does not have an uplink grant. The PUCCH carries uplink control information including channel quality information, acknowledgements, and scheduling requests. Four subframes elapse between the anticipated receipt of the PDSCH DL data message 406 and the sending of an ACK/NACK 408 on the PUCCH.

If the UE 402 does have an uplink grant, the UE 402 will send an ACK 410 if the PDSCH DL data message 406 was correctly received and a NACK if the PDSCH DL data message 406 was not correctly received. The ACK/NACK 410 is sent of the physical uplink shared channel (PUSCH). The PUSCH is the main uplink channel and carries radio resource control (RRC) signaling messages, uplink control information (UCI), and application data.

The eNodeB 404 can use a number of HARQ processes and can use the processes in any order, which is asynchronous HARQ. In asynchronous HARQ the retransmissions can occur any time relative to the initial transmission of the PDSCH DL data message 406. The HARQ information sent to UE 402 can include the HARQ process number. The UE 402 receives the data and finds the HARQ process number. If the message is a retransmission, RETx PDSCH RVx 412, the UE 402 soft combines the data with the data previously stored in the buffer. If the message is a new transmission, the UE 402 buffers the data and checks the CRC codes. When a retransmission RETx PDSCH RVx is sent to the UE 402 it is sent after four subframes elapse after the ACK/NACK 410 is received by the eNodeB 404.

Figure 5:
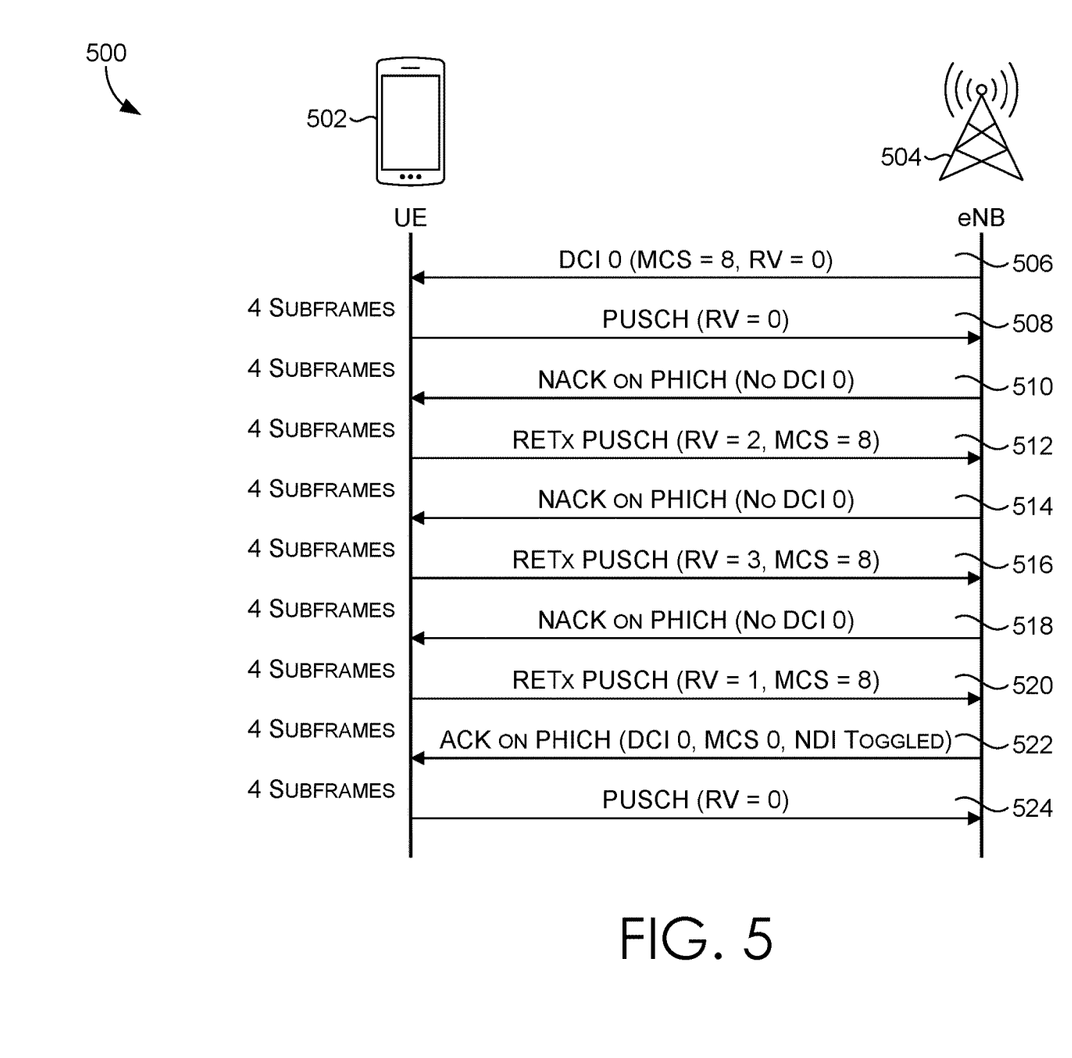
FIG. 5 depicts message flow for a hybrid automatic repeat request (HARQ) procedure during uplink transmission, in accordance with aspects herein.

FIG. 5 depicts message flow for a hybrid automatic repeat request (HARQ) procedure during uplink transmission, in accordance with aspects herein. The uplink HARQ process 500 is used during uplink transmission. The eNodeB 504 informs the UE 502 of the uplink grant is a DCI 0 message 506. When the UE 502 sends data to the eNodeB 504 the data 508 is sent using the physical uplink shared channel (PUSCH). The eNodeB 504 needs to determine the correctness of the data sent. The eNodeB 504 determines the correctness of the data sent using the CRC bits included in the message and also informs the UE 502 of the data received incorrectly or not at all using a NACK 510 on the physical hybrid automatic repeat request indicator channel (PHICH). The PHICH carries both positive ACK messages and negative NACK messages for uplink data transmitted on the PUSCH.

Because the data was not correctly received by the eNodeB 504 the UE 502 retransmits the data in a RETx 512 message sent on the PUSCH after four subframes elapse. The HARQ processes transmit in a round robin fashion to transmit HARQ. As a result, each transmission and retransmission can be determined from the superframe number and the subframe. If the data is still not correctly received, the eNodeB 504 sends another NACK message 514 on the PHICH. The UE 502 again sends a RETX 516 message on the PUSCH. Once again the eNodeB 504 responds with NACK 518 message to the UE 502. The UE 502 again sends a RETx message 520 to the eNodeB 504. This RETx message 520 is successfully received by the eNodeB 504 and a ACK 522 message is sent on the PHICH. At this point, the UE 502 can send a next data message 524 on the PUSCH and the process may repeat as needed. The typical time period between ACK/NACK and RETx messages is four subframes.

The uplink transmission can use adaptive or non-adaptive retransmission. In an adaptive uplink transmission, the modulation and coding scheme and redundant version are determined from the uplink grant DCI 0. In a non-adaptive uplink transmission the transmission attributes remain the same as in the prior transmission. Redundant versions can be assigned according to a pre-defined sequence. The variable CURRENT IRV is an index into the sequence. When the eNodeB 504 does not sent a DCI 0 but instead sends a NACK on the PHICH, then the UE 502 performs a non-adaptive re-transmission. When a re-transmission occurs the eNodeB 504 performs soft combining of the data with the data previously stored in the buffer from the incorrect or incomplete data messages. If the uplink data message from the UE 502 is a new message, the eNodeB 504 buffers the data and checks the CRC.

In HARQ, which uses soft combining, bad packets are not discarded, but are stored in a buffer. The principle of soft combining is that two or more packets with missing or incomplete information can be combined to allow the decoding of the complete signal. The HARQ mechanism is needed to ensure reliable data transmission is wireless communication networks. Reliable data transmission does come at a price as HARQ requires a large buffer be available at the UE and at the base station. While HARQ offers significant benefits, there are occasions when the radio link conditions are good and HARQ is not needed.

Embodiments of the present disclosure provide a dynamic HARQ mechanism that can be activated or deactivated based on radio link conditions. As an example, HARQ could be deactivated if the signal-to-interference and noise (SINR) measurement is better than 10 dB. This can be accomplished by the base station sending a message to the UE to deactivate HARQ. If the SINR becomes less than 10 dB, then the base station sends another message to the UE directing the UE to activate HARQ. The activation and deactivation of HARQ can be based on a number of radio link measurements. The radio link measurements that can be used include: reference signal received quality (RSRQ), reference signal received power (RSRP), and path loss. Other radio link measurements not listed could also be used such as bit error rate (BER).

Wireless network operators want to increase SINR because good SINR maximizes data capacity and throughput. Higher SINR allows for higher quadrature amplitude modulation (QAM) than would otherwise be possible. For busy cell sites, a low SINR has a significant negative effect on lower frequency bands and busy cell sites. Dynamic HARQ activation and deactivation can improve cell edge performance.

Figure 6:
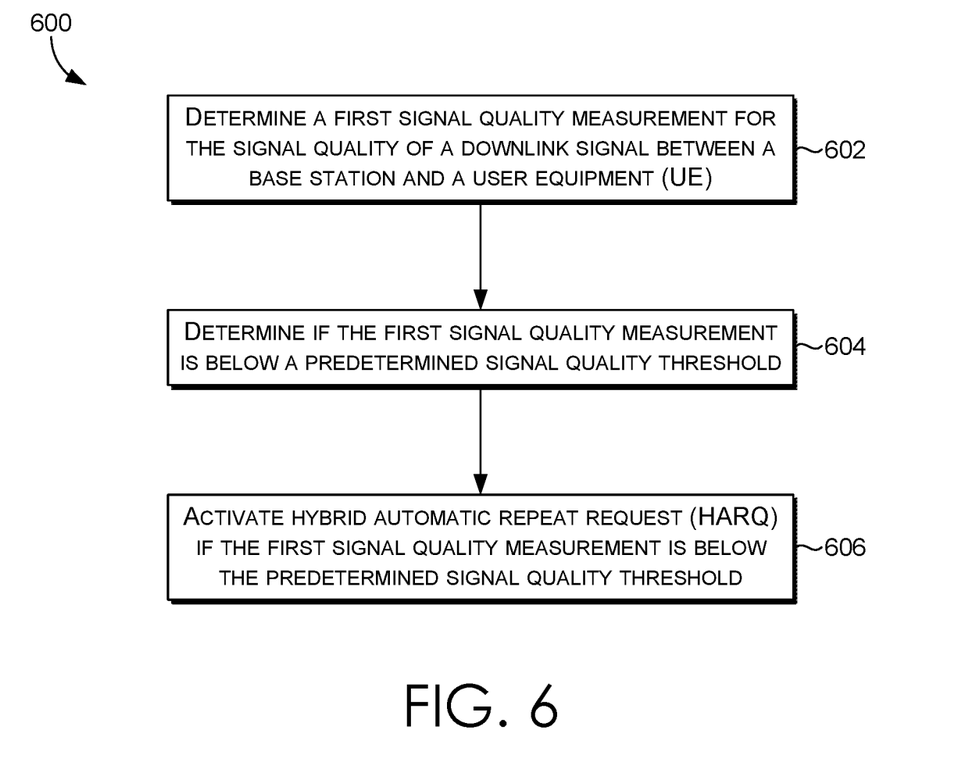
FIG. 6 is a flow diagram of a method of dynamic hybrid automatic repeat request (HARQ) activation and deactivation in a 5G or 6G radio interface, in accordance with aspects herein.

FIG. 6 is a flow diagram of a method of dynamic hybrid automatic repeat request (HARQ) activation and deactivation in a 5G or 6G radio interface, in accordance with aspects herein. The method 600 begins with step 602 which provides: determine a first signal quality measurement for the signal quality of a downlink signal between a base station and a user equipment (UE). Once the first signal quality measurement has been made the method continues with step 604 with; determine if the first signal quality measurement is below a predetermined signal quality threshold. The first signal quality measurement is compared with the predetermined signal quality threshold and if the signal quality is poor then the method continues with step 606: activate HARQ if the first signal quality measurement is below the predetermined signal quality threshold.

The method can be used with common signal quality measurements such as signal-to-interference and noise (SINR), reference signal received quality (RSRQ), reference signal received power (RSRP), and path loss. For illustrative purposes, if the SINR measurement is used, then the predetermined signal quality threshold can be set at 10 dB. If the first signal quality measurement is below 10 dB, then HARQ can be activated. The predetermined signal quality threshold can be set based on network operating historical characteristics and different predetermined signal quality thresholds can be used in different areas or segments of the network. As an alternative embodiment, BER can also be used in place of SINR. If BER is used, HARQ is not used when the BER is less than $1\times10^{-6}$. If the BER greater than the predetermined BER threshold, then HARQ can be activated.

The predetermined signal quality threshold can vary with the type of network. For example, a 5G network may have a different predetermined signal quality threshold than a 6G network. In addition, networks may have separate signal quality thresholds for deactivating HARQ than for activating HARQ. Furthermore, the predetermined signal quality thresholds may differ if the UE is in a frequently congested area or is far from the cell site.

Figure 7:
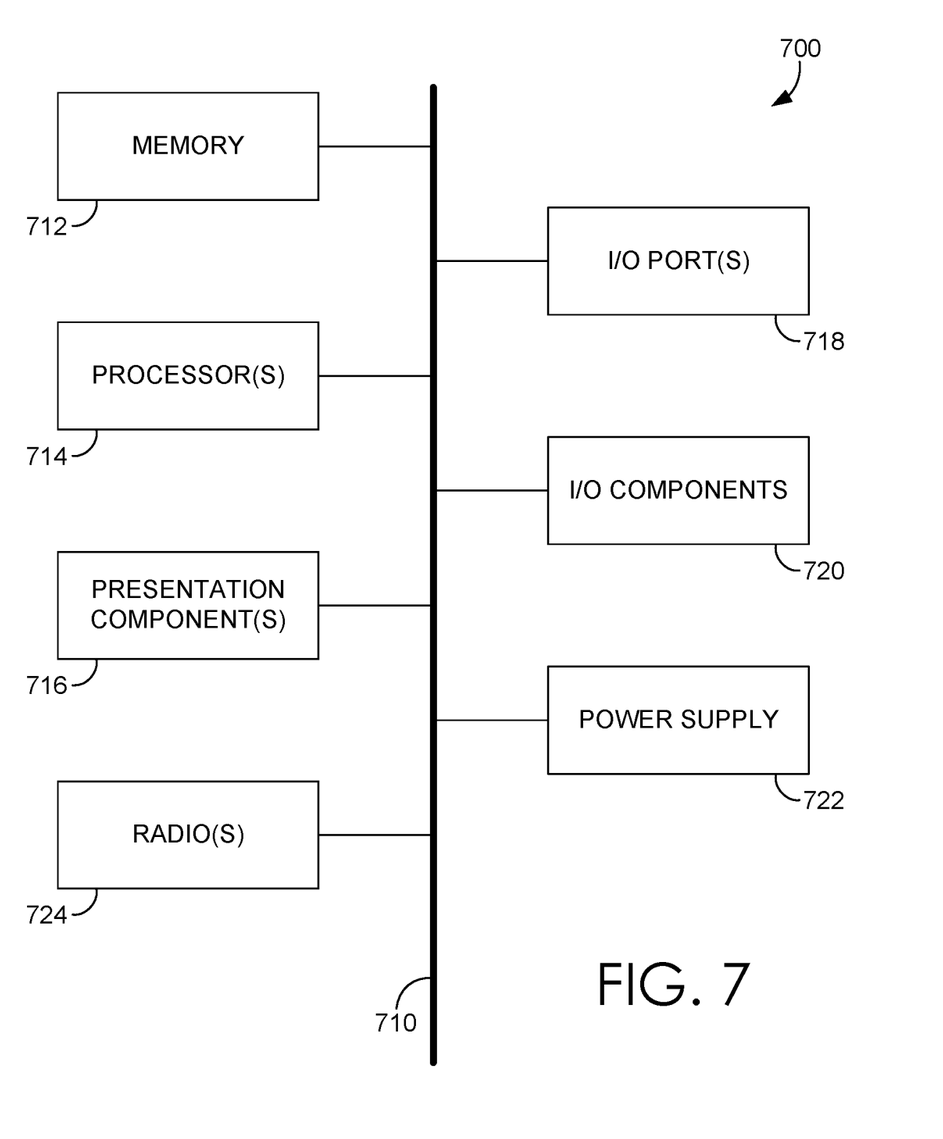
FIG. 7 depicts a diagram of an exemplary computing environment suitable for use in implementations of the present disclosure.

FIG. 7 depicts a diagram of an exemplary computing environment suitable for use in implementations of the present disclosure. Referring to FIG. 7, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108 (e.g., a graphic user interface of a UE), input/output (I/O) ports 110, I/O components 112, a power supply 114 and one or more radios 116. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

The at least one radio 116 facilitates communication with a wireless telecommunications network. In aspects, the radio 116 utilizes a transceiver and/or a combination of transmitters and receivers to wirelessly communicate with the telecommunications network. Illustrative wireless telecommunications technologies that may be used by the radio 116 to wirelessly communicate with the telecommunications network that include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A non-transitory computer storage media storing computer-useable instructions that, when used by one or more processors, cause the one or more processors to:
 determine a first signal quality measurement for a signal quality of a downlink signal between a base station and a user equipment (UE) in a first area of a network;
 determine if the first signal quality measurement is below a predetermined signal quality threshold for the first area;
 activate hybrid automatic repeat request (HARQ) for the first area when the first signal quality measurement is below the predetermined signal quality threshold;
 determine a second signal quality measurement for a signal quality of a second downlink signal between the base station and the UE in a second area of the network, wherein the second area is different from the first area;
 determine if the second signal quality measurement is below a predetermined signal quality threshold for the second area, wherein the predetermined signal quality threshold for the second area is different from the predetermined signal quality threshold for the first area; and
 activate HARQ for the second area when the second signal quality measurement is below the predetermined signal quality threshold for the second area.

2. The non-transitory computer readable media of claim 1, further comprising determine a third signal quality measurement for the measurement of the downlink signal between the base station and the UE in the first area.

3. The non-transitory computer readable media of claim 2, further comprising determine if the third signal quality measurement exceeds the predetermined signal quality threshold for the first area.

4. The non-transitory computer readable media of claim 3, further comprising direct the UE to deactivate HARQ, based on the third signal quality measurement if the third signal quality measurement exceeds the predetermined signal quality threshold for the first area.

5. The non-transitory computer readable media of claim 1, wherein the first signal quality measurement comprises a single signal quality parameter selected from a group comprising: signal-to-interference and noise ratio (SINR), reference signal received quality (RSRQ), reference signal received power (RSRP), and path loss.

6. The non-transitory computer readable media of claim 5, wherein the first signal quality measurement is SINR.

7. The non-transitory computer readable media of claim 6, wherein the pre-determined signal quality threshold for the first area is 10 dB.

8. A method of dynamically activating or deactivating hybrid automatic repeat request (HARQ), comprising:
   determining a first signal quality measurement for a signal quality of a downlink signal between a base station and a user equipment (UE) in a first area of a network;
   determining if the first signal quality measurement is below a predetermined signal quality threshold for the first area;
   activating hybrid automatic repeat request (HARQ) for the first area when the first signal quality measurement is below the predetermined signal quality threshold;
   determining a second signal quality measurement for a signal quality of a second downlink signal between the base station and the UE in a second area of the network, wherein the second area is different from the first area;
   determining if the second signal quality measurement is below a predetermined signal quality threshold for the second area, wherein the predetermined signal quality threshold for the second area is different from the predetermined signal quality threshold for the first area; and
   activating HARQ for the second area when the second signal quality measurement is below the predetermined signal quality threshold for the second area.

9. The method of claim 8, further comprising determine a third signal quality measurement for the measurement of the downlink signal between the base station and the UE in the first area.

10. The method of claim 9, further comprising determine if the third signal quality measurement exceeds the predetermined signal quality threshold for the first area.

11. The method of claim 10, further comprising direct the UE to deactivate HARQ, based on the third signal quality measurement if the third signal quality measurement exceeds the predetermined signal quality threshold for the first area.

12. The method of claim 8, wherein the first signal quality measurement comprises a single signal quality parameter selected from a group comprising: signal-to-interference and noise ratio (SINR), reference signal received quality (RSRQ), reference signal received power (RSRP), and path loss.

13. The method of claim 12, wherein the first signal quality measurement is SINR.

14. The method of claim 13, wherein the pre-determined signal quality threshold for the first area is 10 dB.

15. A system for dynamic activation or deactivation of hybrid automatic repeat request (HARQ), the system comprising:
   one or more processors; and
   one or more computer-readable media storing computer-usable instructions that, when executed by the one or more processors, cause the one or more processors to:
      determine a first signal quality measurement for a signal quality of a downlink signal between a base station and a user equipment (UE) in a first area of a network;
      determine if the first signal quality measurement is below a predetermined signal quality threshold for the first area;
      activate hybrid automatic repeat request (HARQ) for the first area when the first signal quality measurement is below the predetermined signal quality threshold;
      determine a second signal quality measurement for a signal quality of a second downlink signal between the base station and the UE in a second area of the network, wherein the second area is different from the first area;
      determine if the second signal quality measurement is below a predetermined signal quality threshold for the second area, wherein the predetermined signal quality threshold for the second area is different from the predetermined signal quality threshold for the first area; and
      activate HARQ for the second area when the second signal quality measurement is below the predetermined signal quality threshold for the second area.

16. The system of claim 15, wherein the one or more processors are further configured to determine a third signal quality measurement for the measurement of the downlink signal between the base station and the UE in the first area.

17. The system of claim 16, wherein the one or more processors are further configured to determine if the third signal quality measurement exceeds the predetermined signal quality threshold for the first area.

18. The system of claim 17, wherein the one or more processors are further configured to direct the UE to deactivate HARQ, based on the third signal quality measurement if the third signal quality measurement exceeds the predetermined signal quality threshold for the first area.

19. The system of claim 15, wherein the first signal quality measurement comprises a single signal quality parameter selected from a group comprising: signal-to-interference and noise ratio (SINR), reference signal received quality (RSRQ), reference signal received power (RSRP), and path loss.

20. The system of claim 19, wherein the pre-determined signal quality threshold for the first area is 10 dB.

* * * * *